3,591,546
ACRYLONITRILE-BUTADIENE-STYRENE
RESIN COMPOSITIONS
Ronald J. Christmas and Sverre S. Steen, Sarnia, Ontario, Canada, assignors to Polymer Corporation Limited
No Drawing. Filed Aug. 22, 1968, Ser. No. 754,707
Int. Cl. C08d 13/22; C08k 1/36
U.S. Cl. 260—31.2N — 4 Claims

ABSTRACT OF THE DISCLOSURE

An ABS resin especially suitable for electroplating is prepared by blending the resin with a small amount of an organic ester of a long chain fatty acid, e.g. butyl stearate.

---

This invention relates to high impact resistant thermoplastic polymeric compositions. More particularly it relates to thermoplastic acrylonitrile-butadiene-styrene (ABS) resin compositions suitable for coating with metals by electroplating techniques.

ABS resins are well known impact resistant thermoplastic polymers. They may comprise a graft copolymer of a rubbery butadiene polymer backbone onto which are grafted "branches" of styrene-acrylonitrile copolymers. Alternatively they may comprise physical blends of a rubbery butadiene polymer, for example a rubbery butadiene polymer, for example a rubbery butadiene/acrylonitrile copolymer, and a resinous styrene/acrylonitrile copolymer. They may contain other polymerized monomers besides butadiene, acrylonitrile and styrene, for example methyl methacrylate, depending upon the particular properties desired in the final resin.

Because of their satisfactory impact resistance, mouldability, hardness and stability characteristics, coupled with their relatively low density, ABS resins are being used in some applications where metals have heretofore been preferred. Automative parts, such as radiator grills and wheel discs, are particular examples. For such uses, it is desirable to provide the resin with the appearance of metal, by electroplating.

Techniques have been developed for the electroplating of plastics materials with metals, which involve first rendering the plastic electrically conducting. ABS resins have been shown to be one of the most successful plastics materials for electroplating. Sufficiently strong adhesion between the resin and the metal coating must be developed or the plated parts will be deficient in service. Whilst choice of electroplating method, and care with which the plating is carried out are important in obtaining the necessary adhesion, it has been found that the nature and composition of the plastic also have roles to play in this respect.

It is an object of the present invention to provide improved ABS resin compositions for electroplating applications.

The object of the invention is achieved by incorporating in the ABS resin a small amount of an organic ester of a $C_{16}$–$C_{20}$ fatty acid. The organic esters contemplated are those derived from short chain aliphatic alcohols such as methyl, ethyl, propyl, butyl, isobutyl and the pentyl alcohols. The preferred ester is butyl stearate.

The ester is added to the ABS resin in an amount of from about 0.1 to 5 parts, preferably 0.5–3 parts by weight per 100 parts by weight of resin. The addition of too little ester will not have the desired effect in increasing the metal-plastic adhesion after plating. The addition of too much ester will lead to a falling off in other properties of the resin such as impact resistance and tensile strengths.

The esters can be advantageously used in connection with all the various types of ABS resins. It is preferred, to obtain the best final composition for electroplating, to use butyl stearate with graft ABS resins.

Butyl stearate is preferably added to the resin by dry mixing. Conveniently the butyl stearate, which under normal conditions in an oily liquid, is added to the dry resin powder, and the mixture is passed through a compounding extruder to ensure thorough mixing. Alternatively, the butyl stearate could be added to the graft ABS resin prior to final recovery of the resin from its polymerization medium. When the resin is prepared by graft copolymerization in aqueous emulsion, for example, an emulsion of the butyl stearate can be prepared and added to the resin latex prior to coagulation and recovery of the resin.

The invention will be more particularly described with reference to the following specific examples.

EXAMPLE 1

An ABS resin of approximate composition 15 weight percent polymerized butadiene, 61 weight percent styrene and 24 weight percent acrylonitrile was prepared by graft copolymerization of styrene and acrylonitrile onto a preferred rubbery butadiene polymer in emulsion. The resin formed was recovered by coagulation in the form of a fine crumb, and dried.

To a portion of the resin, 1 part of butyl stearate per hundred by weight of resin was added, and the composition passed through a compounding extruder to ensure thorough mixing. Specially designed plaques of standard shape and dimensions were injection moulded from a control resin sample containing no butyl stearate, and from the sample containing butyl stearate. The plaques were generally rectangular, of length about 4½ inches and breadth about 2½ inches. One face of the plaque was planar, whilst the other face was stepped so that the plaque had portions of three different thicknesses, about ⅛ inch, ¼ inch and ⅜ inch. The longitudinal edge of the plaque were bevelled at an angle of about 30°. The moulding was carried out using identical and standard conditions for each sample.

After moulding, the plaques were electroplated using a standard plating technique. In outline, this involves the steps of cleaning, etching, neutralizing, sensitization with, e.g. acidified stannous chloride, activation by deposition of noble metal and electroless metal deposition. The plating technique specifically used was that developed and marketed by the Marbon Chemical Company, Washington, W. Va. The steps involved are described in detail in "Chemical and Engineering News," Mar. 6, 1967, at page 24. The surface of the plaques becomes totally coated with metal so that the plaques become electrically conducting and can be electroplated by normal practice.

After plating under identical conditions, the two plaques were tested for adhesion of the metal plating to the plastic. Parallel cuts were made in the surface of each plaque, one inch apart. The plaques were mounted in a special jig, and the one inch wide strip of metal was peeled off using an Instron tester. A record is made of the pull needed to separate the metal from the plastic plaque, and this value is reported as a peel strength adhesion value, in terms of pounds per inch.

The control plaque of the present example had a peel strength adhesion of 6.3 pounds/inch. The plaque prepared from the resin sample containing butyl stearate had a peel strength adhesion of 10.0 lbs./inch.

EXAMPLE 2

In this example, two ABS resin samples were prepared having approximately the same composition as the ABS in Example 1. One sample was mixed with 2 parts by weight per hundred parts of resin of butyl stearate. No butyl stearate was added to the control sample.

Identical plaques of the previously described design were injection moulded from the two samples and plated using the Macuplex Nickel System. This system is generally similar to that used in Example 1. It is fully described in "Chemical and Engineering News," June 13, 1966 pages 80–82. The two plaques were plated and tested under identical conditions.

The plaque moulded from the control sample had a peel strength adhesion of 8.1 lbs./inch, whereas that from the sample containing 2 parts of butyl stearate had a peel strength adhesion of 13.5 lbs./inch.

What is claimed is:

1. A process for improving the adhesion of an electroplated metal coating to a thermoplastic resin substrate consisting of a resinous acrylonitrile-butadiene-styrene polymer which comprises (1) blending into said polymer 0.5–3 parts by weight of an organic ester of a $C_{16}$ to $C_{20}$ fatty acid and an alcohol selected from the group consisting of methyl alcohol, ethyl alcohol, propyl alcohol, butyl alcohol and pentyl alcohol, (2) forming such polymer into a substrate and then shaping and electroplating the blend.

2. The process of claim 1 wherein the ester is butyl stearate.

3. The process of claim 2 wherein the ester is incorporated by dry mixing with the resin.

4. The process of claim 2 wherein the ester is incorporated by adding an aqueous emulsion of the ester to the resin latex prior to coagulation.

References Cited

UNITED STATES PATENTS

| | | | |
|---|---|---|---|
| 2,606,163 | 8/1952 | Morris et al. | 260—23 |
| 2,957,833 | 10/1960 | Baum | 260—31.2 |
| 2,962,463 | 11/1960 | Schroeder et al. | 260—28.5 |
| 3,406,136 | 10/1968 | Scarso et al. | 260—23.7 |

DONALD E. CZAJA, Primary Examiner

R. W. GRIFFIN, Assistant Examiner

U.S. Cl. X.R.

117—138.8R; 204—181